United States Patent
Gallagher et al.

(10) Patent No.: US 7,062,554 B1
(45) Date of Patent: Jun. 13, 2006

(54) TRACE MONITORING IN A TRANSPORT NETWORK

(75) Inventors: Niall Gallagher, Belfast (GB); Mark Carson, Belfast (GB)

(73) Assignee: Nortel Networks Limited, St. Laurent (CA)

( * ) Notice: Subject to any disclaimer, the term of this patent is extended or adjusted under 35 U.S.C. 154(b) by 491 days.

(21) Appl. No.: 10/324,706

(22) Filed: Dec. 20, 2002

(51) Int. Cl.
*H04L 12/26* (2006.01)
*H04L 12/08* (2006.01)

(52) U.S. Cl. .................................. 709/224

(58) Field of Classification Search ......... H04L 12/08
See application file for complete search history.

(56) References Cited

U.S. PATENT DOCUMENTS

| | | | | |
|---|---|---|---|---|
| 6,104,702 | A | * | 8/2000 | Vissers ..................... 370/241 |
| 6,226,270 | B1 | * | 5/2001 | Chiku et al. ............... 370/248 |
| 2003/0097439 | A1 | * | 5/2003 | Strayer et al. ............. 709/224 |
| 2004/0179518 | A1 | * | 9/2004 | Bruckman et al. ......... 370/358 |

FOREIGN PATENT DOCUMENTS

JP  2000188596 A  *  7/2000

OTHER PUBLICATIONS

Matsunaga, H.et al.; Virtual path trace function for effective administration of ATM networks; Global Telecommunications Conference, 1992. Conference Record., GLOBECOM '92. 'Communication for Global Users'., IEEE Dec. 6-9, 1992; pp. 1245-1249.*
URL: http://www.xilinx.com/page_moved/ipcenter_c.htm?url=/products/logicore/alliance/coreel/paxonet_crc32.pdf.*
URL: http://www.cypress.com/portal/server.pt?space=CommunityPage&control=SetCommunity&CommunityID=223&PageID=450.*

* cited by examiner

*Primary Examiner*—R. Stephen Dildine
(74) *Attorney, Agent, or Firm*—Barnes & ThornburgLLP

(57) ABSTRACT

An apparatus for monitoring a path or section trace identifier. The apparatus receives the trace identifier and subjects it to a transform algorithm to produce a transformed trace identifier. The apparatus then compares the transformed trace identifier with a correspondingly transformed expected trace identifier and determines if there is a match or a mismatch. The CRC-32 (32-bit cyclic redundancy check) checksum algorithm may be used. The algorithm produces transformed trace identifiers that are significantly smaller than the non-transformed trace identifiers.

15 Claims, 2 Drawing Sheets

TRACE MONITORING IN A TRANSPORT NETWORK

FIELD OF THE INVENTION

The present invention relates to monitoring data signal identifiers and, in particular, to path or section trace monitoring in a transport network. The invention relates particularly to synchronous transport networks, such as SDH (Synchronous Digital Hierarchy) transport networks or SONET (Synchronous Optical Network) transport networks.

BACKGROUND TO THE INVENTION

A traffic data signal is commonly associated with a path trace identifier, or section trace identifier, which carries information identifying the data signal. The path trace, or section trace, information is normally used to verify network connectivity. Typically, this is achieved by comparing 'expected' trace information with 'received' trace information. If there is mismatch, then this is an indication of a misconnection.

In an SDH/SONET network, the J1 or J2 byte of the traffic data structure normally serves as the path trace component, while the J0 byte serves as a section trace component. The path trace, or section trace, data itself normally comprises a string of 16 or 64 bytes, being comprised of the contents of 16 or 64 successive instances of the J0, J1 or J2 byte as appropriate.

Conventionally, at a given network element, the path trace, or section trace, string is extracted from an incoming data signal for comparison against an 'expected' path trace, or section trace, string which is stored locally. One option is to extract and store the entire incoming trace string, to compare the received string against the 'expected' string and to make a match or mismatch decision. Alternatively, as each respective byte of the incoming trace string arrives, it is compared against the corresponding byte in the 'expected' string. The latter option obviates the need to store the entire incoming path, or section, trace string. Nonetheless, at least the current incoming path, or section, trace byte and the entire 'expected' path, or section, trace string must be stored locally at the network node. This represents a relatively large storage overhead. The problem is exacerbated by the fact that the incoming data signal may comprise a plurality of smaller data signals, or channels, in respect of each of which the network element may be required to store a respective 'expected' path, or section, trace string. Because of the physical limitations of the network element, it is common that only a limited number of path or section traces can be monitored at any one time. Typically, a relatively small number of path, or section, trace monitors are rotated in order to provide coverage of all channels.

It would be desirable, therefore, to provide more efficient path, or section, trace monitoring which has relatively low storage requirements.

SUMMARY OF THE INVENTION

Accordingly, a first aspect of the invention provides an apparatus for monitoring an identifier associated with a data signal, the apparatus being arranged to receive the identifier and to transform the received identifier, the apparatus being further arranged to compare the transformed received identifier with a correspondingly transformed expected identifier and to determine if there is a match or a mismatch, wherein the apparatus is arranged to transform the received identifier such that the transformed received identifier is smaller than the received identifier.

Since the transformed identifiers are smaller than the non-transformed identifiers, the storage requirements of the apparatus are reduced.

Preferably, the apparatus is arranged to perform a transform algorithm on the received identifier, the transform algorithm being such that a respective detectably different transformed received identifier is generated in respect of received identifiers which are dissimilar and for received identifiers which are similar, or substantially identical, but not identical.

Preferably, the transform algorithm comprises a hashing algorithm, or a checksum algorithm, or a compression algorithm. More preferably, transform algorithm comprises a cyclic redundancy check (CRC) algorithm. In a particularly preferred embodiment, the transform algorithm comprises a CRC32 checksum algorithm.

Preferably, the received identifier comprises a plurality of identifier components, the apparatus being arranged to generate the transformed identifier by transforming each identifier component in turn to produce a respective transformed part-identifier, and wherein the transformed part-identifier generated in respect of one identifier component is used in the generation of the transformed part-identifier of the subsequent identifier component. More preferably, the apparatus is in communication with a first storage device for storing transformed part-identifiers, the apparatus including a transform generator arranged to receive an identifier component and a stored transformed part-identifier, to generate an updated transformed part-identifier, and to store the updated transformed part-identifier in the first storage device.

Preferably, the apparatus is arranged to monitor a plurality of data signals each being associated with a respective identifier, the first storage device comprising a respective storage location for each data signal to be monitored.

Preferably, the apparatus is in communication with a second storage device in which one or more transformed expected identifiers are stored during use.

Preferably, the apparatus includes a comparator arranged to receive and to compare the transformed received identifier with a corresponding transformed expected identifier obtained from the second storage device.

In the preferred embodiment, the apparatus is arranged to operate with a data signal which conforms with an SDH (Synchronous Digital Hierarchy) and/or a SONET (Synchronous Optical Network) data structure, and wherein the signal identifier comprises a path or section trace identifier.

A second aspect of the invention provides a network element comprising the apparatus of the first aspect of the invention.

A third aspect of the invention provides a transport network comprising at least one network element of the second aspect of the invention.

A fourth aspect of the invention provides a method of monitoring an identifier associated with a data signal, the method comprising: receiving the identifier; transforming the received identifier to produce a transformed identifier that is smaller than the received identifier; comparing the transformed received identifier with a correspondingly transformed expected identifier; determining if there is a match or a mismatch.

A fifth aspect of the invention provides a computer program product comprising computer useable code arranged to cause a computer to perform the method of the fourth aspect of the invention.

Other advantageous aspects and features of the invention will be apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art

BRIEF DESCRIPTION OF THE DRAWINGS

A specific embodiment of the invention is now described by way of example and with reference to the accompanying drawings in which.

DETAILED DESCRIPTION OF THE DRAWINGS

Figure 1:
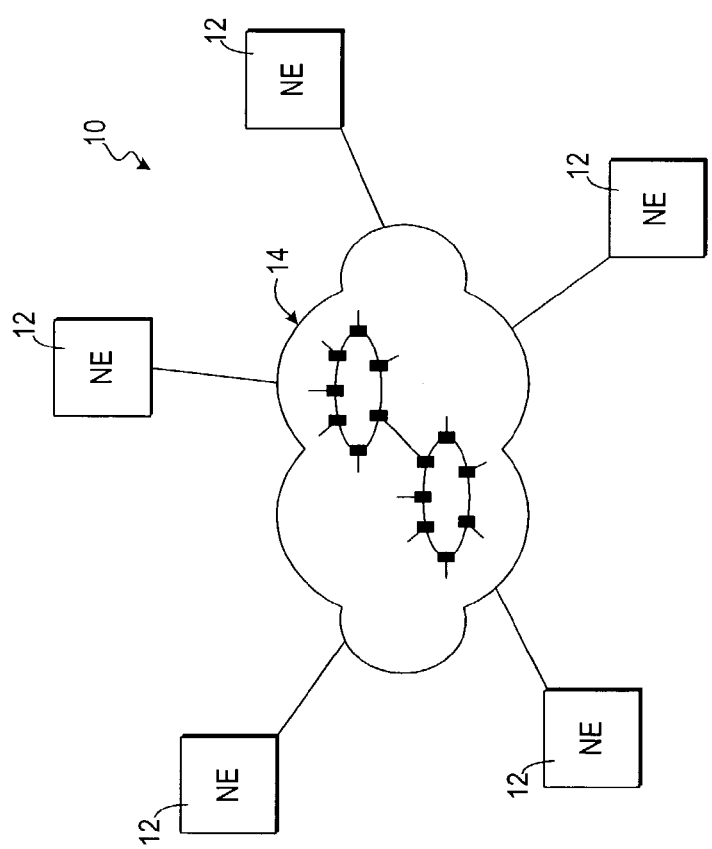
FIG. 1 is a schematic view of a transport network.

FIG. 1 of the drawings shows, generally indicated at 10, a transport network comprising a plurality of network elements 12 in communication with one another via a network infrastructure 14. The network infrastructure 14 may comprise further network elements or nodes, and/or sub-networks, arranged in conventional network configurations such as ring configuration, hub configuration, mesh configuration, point-to-point configuration, or a combination thereof. The network elements typically comprise transmission apparatus such as a router, a switch, a multiplexer, a regenerator or a cross-connect (not shown). The network 10 may, for example, comprise a synchronous transport network, or synchronous transmission system, such as a SONET and/or SDH network. In this case, the transmission apparatus are commonly known as synchronous transmission apparatus.

Figure 2:
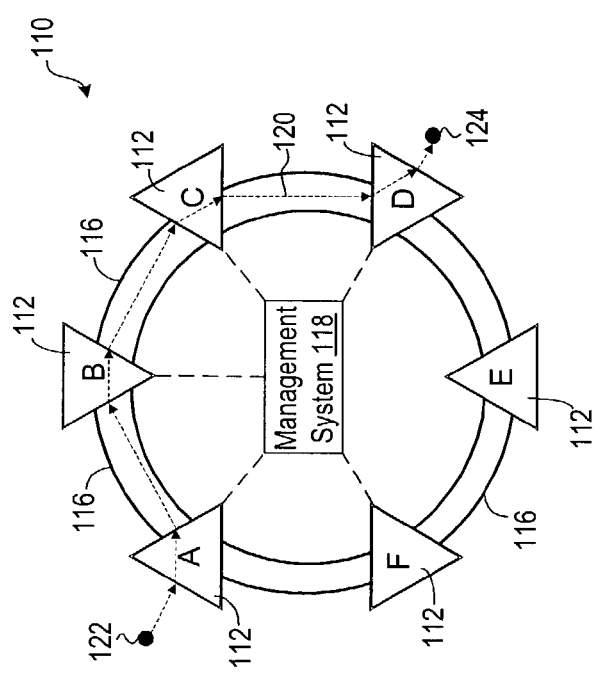
FIG. 2 is a schematic view of an example ring network.

For the purposes of illustration, the invention is described in the context of a synchronous transport network and, more particularly, in the form of a simple ring network, but is not limited to such. FIG. 2 gives a schematic view of a ring network 110, being a specific example of the network 10. The network 110 includes network elements 112, labelled A, B, C, D, E and F, interconnected by network sections 116.

A synchronous transport network is arranged to transport data signals, or traffic, arranged in accordance with a data frame structure. There are a number of standard frame structures defined by, for example, ITU-T (International Telecommunications Union-Telecommunications standardization sector) and Bellcore (now known as Telcordia), that are commonly used in synchronous transmission systems. In SDH and SONET transmission systems, data signals are packaged into frames known as Synchronous Transport Modules (STMs) and Synchronous Transport Signals (STSs) respectively.

An STM frame comprises a payload area, an AU pointer area and a section overhead (SOH) area. In the payload area data signals are mapped into containers, commonly referred to as Virtual Containers (VCs) in SDH terminology. In SONET, the frame structure is substantially similar although the terminology differs, as is well known. For example, the SONET equivalent of section overhead is transport overhead (TOH) and, in SONET, containers are known as synchronous payload envelopes (SPEs). In the following description, primarily SDH terminology is used, although it will be understood that the invention applies equally to SONET. Each container, or envelope, also includes additional data known as the path overhead (POH). The payload data (i.e. the data carried in the payload area) comprises the main information that it is desired to transport across the network 10, 110 e.g. audio and/or visual data, while the path overhead data is normally used to carry information for use in end-to-end management of a path taken by the relevant data signal(s) across the network 10, 110. Within the payload area, some containers (known in SDH as low order data structures) may be nested inside larger containers (known in SDH as high order data structures). Both low order and high order data structures normally comprise path overhead.

Further control information, known in SDH as the section overhead (SOH), or equivalent overhead, is added to the frame. The normal purpose of the section overhead is to provide communication channels between adjacent network elements 12, 112 (normally referred to as sections) for functions including operations, administration and maintenance (OA&M) facilities, protection switching, section performance and frame alignment. The pointers, which are normally used to locate the containers/envelopes within the frame, are not relevant to the present invention and are not described herein.

The composition of SDH/SONET data frame structures are well known and are described in ITU-T standard G.707 and Telcordia GR253 respectively, which are hereby incorporated herein by reference. Further equivalent standards include ATIS T1.105 and ETSI ETS 300 147.

G.707 and GR253 define a path trace and section trace function for SDH/SONET networks. A path trace is used to monitor a signal path or channel, whereas a section trace is used to monitor a signal or channel as it is transported between adjacent network elements. A component of the data frame structure is assigned to carry path trace or section trace information. According to the standards, the frame components used for this purpose are the Jx bytes, where x=0, 1 or 2. J0 is a section trace byte whereas J1 and J2 are path trace bytes. Each data signal may be associated with a respective signal identifier in the form of a path trace identifier, commonly known as a Path Access Point Identifier (API), which may be used to identify the data signal. The API comprises a string of components, usually single byte ASCII characters. Current standards dictate that an API comprises either 16 or 64 bytes and so a typical API comprises either 16 or 64 one byte characters. Hence, successive J1 or J2 bytes carry a respective character of an API. A signal identifier in the form of a section trace identifier is carried by successive J0 bytes in similar manner. The invention is described hereinafter primarily in the context of path trace identifiers although it will be understood to apply equally to section trace identifiers. Hence, reference hereinafter to path trace may be taken to embrace section trace, particularly where the signal identifier is carried by the J0 byte.

In high order data structures (such as the VC-4, STS-1, and the like) and the VC-3 low order data structure, the J1 Byte of path overhead is used to carry path trace information. A 16 byte path trace identifier (i.e. API), comprising 15 single byte ASCII characters terminated by a single byte check character, is used for SDH payloads. For SONET data signals, a 64 byte path trace identifier is used. This comprises either 62 or 63 single byte ASCII characters terminated by either two or one termination characters respectively. One J1 byte is transmitted as part of each high order data structure and so each data frame comprises one J1 byte per high order payload. For example, an STM-1 frame which comprises a single VC-4 will comprise a single J1 byte, while an STM-16 frame which comprises 16 VC-4s may comprise 16 J1 bytes, one in respect of each VC-4, respective J1 bytes carrying a component of a respective API (other payload types, for example concatenated payloads, will result in other numbers of APIs). It therefore takes a total of 16 frames to receive an SDH path trace identifier and 64 frames to receive a SONET path trace identifier.

Other low order data structures (such as VC-11, VC-12, VT-1.5, VT-2, and the like) use the J2 byte of the low order path overhead to carry the path trace information. SDH payloads use a 16 byte path trace identifier identical to that used for high order SDH payloads. Low order SONET payloads also have a J2 byte, which is allocated for a path trace function, but which is currently undefined.

A J2 byte is transmitted once per multi-frame. A multi-frame occupies four standard high order frames. Accordingly, a 16 byte SDH path trace identifier for such low order payloads takes 64 frames to be received.

A path trace identifier is generally used to uniquely identify a data signal, or channel. A data signal carried by a high order data structure may comprise a plurality of smaller data signals, or channels, each carried by a respective low order data structure. Each data signal, or channel, may be associated with its own respective path trace identifier. For example, a VC-4 containing 84 VC-11 channels could contain one J1 path trace identifier and 84 J2 path trace identifiers.

In order to perform path trace monitoring, a network element 12, 112, must be able to compare a 'received' path trace identifier against an 'expected' path trace identifier and determine if there is a match or a mismatch. Conventionally, the network element 12, 112 includes a storage device, such as a RAM (Random Access Memory), for storing a respective path trace identifier for each signal path (high order and or low order) that it is required to monitor. Additionally, the network element includes means for storing at least the current byte of the 'received' path trace identifier. The hardware normally required to store path trace identifiers is considered to be relatively large and so can be costly to implement.

FIG. 2 provides a simple example of a network 110 in which at least some of the network elements 112 are arranged to perform path trace monitoring. In FIG. 2 there is shown a traffic signal, or data signal 120, being transported across network 110 from a source End System (ES) 122 to a destination End System (ES) 124. The End Systems 122, 124 may take any suitable form, for example a private telephone exchange or a PC (Personal Computer). The signal 120 is mapped into an appropriate container, e.g. VC or SPE, at network element A (NE A) and transported in normal manner across the network 110 to network element D (NE D), via network elements B and C. At NE D, the signal 120 is extracted from the container for delivery to the destination End System 124. Thus, the portion of the signal 120 emanating from, and being received by, End Systems 122, 124 comprises the payload data, the path overhead data being respectively added and removed at network elements A and D. The route taken by the signal from NE A to NE D is commonly known as its path.

A network management apparatus, or system 118 is normally arranged to, amongst other things, manage the path trace function. For example, assuming that data signal 120 is mapped into a low order data structure, say a VC-12, NE A, then the data signal 120 should be transported from NE A to NE D on a VC-12 path.

Assuming that path trace monitoring is required, the management system 118 provides NE A with a path trace identifier for signal 120. NE A incorporates the path trace identifier into successive J2 bytes of the path overhead associated with the VC-12, as described above. The management system 118 also communicates the path trace identifier to one or more of NEs B, C and D, upon which NEs B, C and D store the path trace identifier as an 'expected' path trace string.

Similarly, the VC-12 signal 120 may be transported between NEs A and B, or between B and C, or C and D as part of a high order payload, e.g. as part of a VC-4 payload. The high order payload may also have a path trace identifier carried by the J1 byte of the associated path overhead. Hence, NEs B, C and D may also have to store an expected path trace identifier in respect of the high order data signal.

It will be apparent, therefore, that each network element 112 that is required to perform path trace monitoring may be capable of receiving many data signals (both high order and low order) and may be required to store 'expected' path trace information in respect of each signal path that requires monitoring.

One aspect of the present invention provides an apparatus for monitoring an identifier associated with a data signal. In the preferred embodiment, the apparatus is a path, or section, trace monitoring apparatus, suitable for use in a network element 12, 112, which has relatively low storage requirements in comparison to conventional equipment described above.

The path trace monitoring apparatus is operable on a transformed path trace identifier which is smaller than the conventional path trace identifier described above but which is nonetheless substantially uniquely representative of the corresponding non-transformed path trace identifier. A conventional path trace identifier may be transformed using any suitable transform algorithm. However, it is preferred that the transform algorithm exhibits at least some, and advantageously all, of the following features: production of a predictable, repeatable output when used with the same input data; the transform algorithm should lend itself to efficient hardware implementation in terms of logic gate count and speed of operation; the output of the transform algorithm should vary significantly, or at least detectably, depending on the input data, even with only a small change in the input data, i.e. the output of the transform is unique, or substantially unique not only for dissimilar inputs, but also for inputs which are similar or substantially identical. The latter feature allows differentiation of respective outputs that have been generated from similar, valid input strings. This facilitates the detection of errors in path trace data since an erroneous path trace string may only differ in one or more bit positions from the 'expected' string.

Suitable transform algorithms include Hashing algorithms (which are commonly defined as algorithms which take a variable length message input and produce a fixed length message, or 'fingerprint', as the output), most Checksum algorithms and some Compression algorithms and techniques. In the preferred embodiment of the invention, the transform algorithm comprises a CRC (Cyclic Redundancy Check) algorithm and, by particular preference, a CRC32 (32-bit cyclic redundancy check) algorithm. CRC32 algorithms (hereinafter CRC32) are well known and examples are described in the text *CRC Standard Mathematical Tables* and Formulas (30$^{th}$ Edition: ISBN 0-8493-2479-3). CRC32 transforms input data to generate an output comprising a 32-bit checksum, and exhibits all of the preferred algorithm features outlined above (although it is noted that there is an extremely low chance (approximately 1 in 4 billion) that CRC32 will produce the same output for two different inputs). Hence, rather than storing and operating on conventional multi-character (e.g. 16 or 64 byte) path trace identifiers, the preferred path trace monitoring apparatus is arranged to create, store and operate on 32-bit (i.e. 4 byte) representations of the conventional path trace identifier. By way of example, a CRC32 algorithm using the polynomial defined in Ethernet IEEE802.3 standards is suitable for use in the apparatus described hereinafter.

Figure 3:
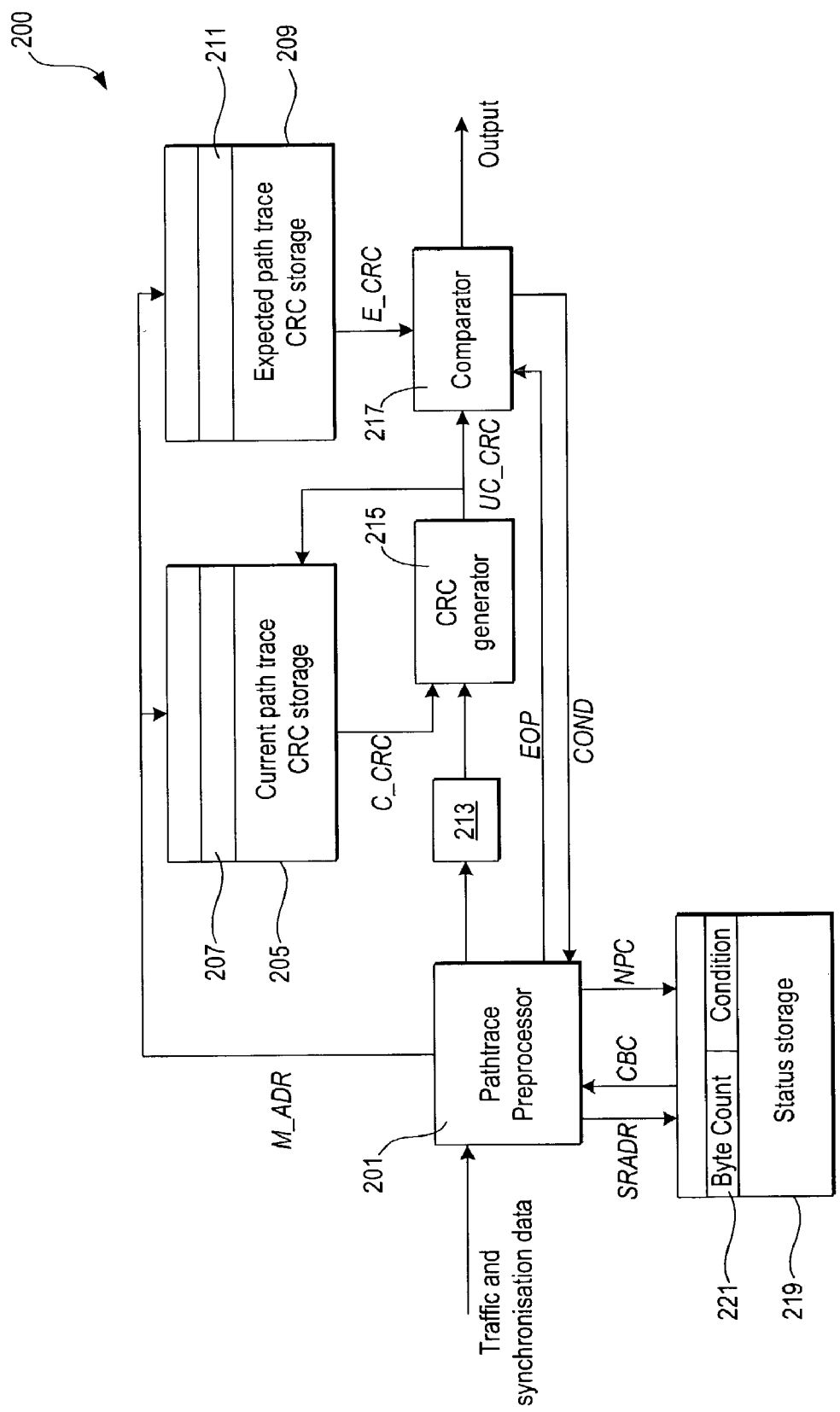
FIG. 3 is a schematic view of a preferred embodiment of a trace monitoring apparatus according to one aspect of the invention.

FIG. 3 illustrates a preferred embodiment of the path trace monitoring apparatus, generally indicated at 200, in accordance with one aspect of the present invention. The apparatus 200 is suitable for inclusion in a network element 12, 112.

The path trace monitoring apparatus 200 includes, or is in communication with, a first storage device 205 for storing a respective current, or working, CRC value generated from the path trace identifier of an incoming data signal. The current CRC storage device 205 comprises a respective storage, or memory, location 207 (only one shown) for each channel of the incoming data signal in respect of which path trace monitoring is required. For example, for an incoming data signal carried by an STM-1 frame and comprising only a VC-4 payload, only one memory location 207 is required. Should, say, the VC-4 comprise 84 VC-11 channels, then 85 storage locations (one for each low order channel and one for the high order channel) may be required. In the present example, the memory locations 207 each comprise 32 bits storage capacity.

The apparatus 200 further includes, or is in communication with, a second storage device 209 for storing CRC values corresponding to 'expected' path trace identifiers transformed by CRC32. The expected CRC storage device 209 comprises a respective storage, or memory, location 211 (only one shown) for each channel of the incoming data signal in respect of which path trace monitoring is required. In the present example, the memory locations 207 each comprise 32 bits storage capacity. Conveniently, the 'expected' CRC values are generated externally of the apparatus 200 (usually within the network element 12, 112 in which the apparatus 200 is located) by transforming the respective 'expected' path trace identifiers using CRC32. The 'expected' CRC values are stored in the expected CRC storage device 209 before path trace monitoring begins, or at least before the 'expected' CRC values are required for comparison purposes. The memory locations 207 of the current CRC storage device 205 are initialised to store respective initial values which correspond to the respective initial values that were used to generate the 'expected' CRC values.

Conveniently, the current and expected CRC storage devices 205, 209 can be implemented in RAM.

The path trace monitoring apparatus 200 includes a path trace pre-processor 201 arranged to receive traffic and synchronisation data. In particular, the pre-processor 201 is arranged to receive the data signal, or a part thereof, in respect of which path trace monitoring is required; an indictor that the data signal component which carries the path trace identifier has been received by the network element 12, 112; and, where an incoming data signal may comprise more than one channel, an identifier of the channel which requires monitoring (channel ID). This information can conveniently be supplied to the pre-processor 201 by conventional signal processing apparatus, such as pointer processing apparatus (not shown), which receive and process data signals received by a network element 12, 112 in conventional manner. In the present example, the data signal component which carries the path trace identifier comprises the Jx byte (i.e. the J0, J1 or J2 byte depending on what type of signal is being monitored) and the pre-processor 201 therefore receives an indicator upon arrival of at least a first Jx byte and preferably upon arrival of each Jx byte. Upon receipt of the Jx indicator, the pre-processor 201 determines that the current received data signal component comprises the corresponding Jx byte. In this way, the pre-processor is able to locate, or extract, the Jx byte from the incoming traffic data. Should the arrangement be such that an indicator is received only in respect of a first Jx byte, then the pre-processor 201 should be arranged to count subsequently received bytes to determine the location of subsequent Jx bytes.

The pre-processor 201 is also arranged to synchronise itself with the path trace identifier being carried by the Jx byte. Typically, the character string which makes up the path trace identifier includes a recognisable termination character, for example a check byte, at the end of the string. For example, a 16 byte path trace identifier usually comprises 15 single byte path trace characters followed by a single check byte. Conveniently, the pre-processor 201 is arranged to locate the start of the path trace identifier by detecting a termination character and determining that the next received Jx byte carries the first component of the path trace identifier. The pre-processor 201 synchronises a counter (not shown), or other marker, to the receipt of the path trace identifier by initiating the counter upon receipt of the start, i.e. first component, of the path trace identifier. The counter, which may conveniently be included in the pre-processor 201, is operated to count the number of Jx bytes received after the start of a path trace identifier and so to mark the current position within the path trace identifier. For example, for a 16-byte path trace identifier, the pre-processor 201 may initialise the counter to zero upon receipt of the start of the path trace identifier and subsequently increment the counter by one for each received Jx byte until the counter reaches 15 after which the counter preferably rolls over to zero. As is described in more detail hereinafter, the pre-processor 201, by means of the counter, controls, or synchronises, the operation of the remaining components of the apparatus 200.

The pre-processor 201 controls the reading of CRC values from the respective CRC value storage devices 205, 209. In cases where there is more than one data channel to be monitored and therefore more than one respective CRC value stored in each storage device 205, 209, the pre-processor 201 uses the channel ID to address the storage devices 205, 209. This is illustrated in FIG. 3 as memory address signal M_ADR. The value of M_ADR addresses a memory location 207 in storage device 205 and so determines which current CRC value (C_CRC in FIG. 3) is read from the current CRC memory device 205, and which expected CRC value (E_CRC in FIG. 3) is read from the expected memory device 209.

The apparatus 200 further includes a device for storing the received path trace identifier. In the preferred embodiment, only the current component of the received path trace identifier is stored. Hence, the apparatus 200 preferably includes a data register 213, or other suitable storage device, for storing the current Jx byte received by the pre-processor 201.

A transform engine in the form of a CRC generator 215 is also provided. In the preferred embodiment, the CRC generator 215 is arranged to perform the CRC32 algorithm in conventional manner. In particular, the CRC generator 215 is arranged to receive, and operate on, a 32-bit current CRC value C_CRC (provided by the current CRC storage device 205) and the current path trace component, namely the Jx byte stored in register 213, to produce an updated current CRC value UC_CRC which is also 32 bits in length. The UC_CRC value is written to the addressed memory location 207 in the current CRC value storage device 205 to replace the C_CRC value upon which the CRC generator 215 has just operated. In the preferred arrangement, the data register 213 creates a data pipeline which serves to synchronise the provision of the received component of the path trace identifier and the corresponding C_CRC value to the CRC generator 215. Suitable conventional implementation detail for a CRC generator may be found at http://www.xilinx.com. In the preferred embodiment, parallel CRC computation is employed and information concerning this technique may be found at http://www.cypress.com.

The UC_CRC value is also supplied to a comparator 217 which, in the present example, comprises a conventional 32-bit comparator. The comparator 217 also receives the E_CRC value which is read from the addressed memory location 211 in storage device 209. The comparator 217 compares the received UC_CRC value with the received E_CRC value to determine if there is a match or a mismatch. Until the whole of the path trace identifier is processed in this way, the UC_CRC value is only a transformed part-path trace identifier. Hence, the outcome of this comparison is valid when the whole incoming path trace identifier has been processed by the CRC generator 215 to produce a 'final' UC_CRC value. The final UC_CRC value is produced upon processing of the last component of the incoming path trace identifier, the occurrence of which may be indicated by the output of the counter. Hence, when the counter indicates that the last path trace identifier component is being processed (e.g. the count is 15 for a 16 byte path trace string), the pre-processor 201 signals this event to the comparator 217 (shown in FIG. 3 as end of path trace signal EOP). In the preferred embodiment, the comparator 217 issues a valid output signal indicating the outcome of the comparison operation (either a match or a mismatch) when EOP asserts that the end of the path trace identifier has been reached. The output of the comparator 217 may be reported to any appropriate external system, for example the management system 118.

Preferably, the apparatus 200 also includes, or is in communication with, a third storage device 219 for storing status information relating to the status of the path trace monitoring. The status storage device 219 preferably stores information identifying which component of the path trace identifier has most recently been processed (hereinafter referred to as byte count), together with an indication of whether the comparator 217 has detected a match or a mismatch at the time that the identified path trace component was processed (hereinafter referred to as condition). The byte count is conveniently derived from the output of the counter. The condition is derived from the output of the comparator 217. The status storage device 219 thus includes a respective memory location 221 for each channel, at which memory location 221 the respective status information is stored. Conveniently, the pre-processor 201 is arranged to maintain the status storage device 219. To this end, the comparator 217 is arranged to signal to the pre-processor 201 whether it detects a match or a mismatch (shown in FIG. 3 as condition signal COND). Using the channel ID to address the status storage device 219 (shown in FIG. 3 as address signal SRADR), the pre-processor 201 stores the byte count and the corresponding condition in the appropriate memory location 221 (shown in FIG. 3 as signal NPC). The information held in the status storage device 219 may be accessed by an external system, e.g. the management system 118, as and when required. To avoid having to use a separate counter for the byte count of each channel monitored, the pre-processor 201 preferably uses a single counter (not shown) and, when updating the status storage device 219 in respect of a given channel, obtains the current respective byte count value for that channel from the respective memory location 221 (shown in FIG. 3 as signal CBC) and causes the counter to increment the obtained byte count by one to create the new byte count which is then stored in the respective memory location 221 by signal NPC. FIG. 3 shows the status storage device 219 as a single storage device, for example a single RAM. Equally, however, more than one storage device may be used to store the status information. For example, two RAMs (not shown) or other storage devices may be used to store the byte count and the condition respectively.

The components of the apparatus 200 are synchronised to a common clock (not shown), typically the local timing signal of the network element 12, 112 in which the apparatus 200 is incorporated. The operation of the components is further synchronised to the receipt of Jx bytes, conveniently via the output, byte count, of the counter, to ensure in particular that, in respect of each received Jx byte, the appropriate C_CRC and E_CRC values are read from the respective storage devices 205, 209, and the appropriate byte count and condition information is written to the status storage device 219.

The typical operation of the apparatus 200 is now described. Respective externally generated 'expected' CRC values are loaded into the respective memory locations 211 of storage device 209. The memory locations 207 of storage device 205 are initialised to the same initial value that was used to generate the 'expected' CRC values. The pre-processor 201 locates the start of an incoming path trace identifier string and, upon location of same, initialises the counter. Each received Jx byte is, in turn, stored in the data register 213 and supplied to the CRC generator 215 together with the C_CRC value read from the current CRC storage device 205. The CRC generator 215 processes the Jx byte and the C_CRC value to produce an updated CRC value UC_CRC which is stored in the current CRC storage device 205. The stored UC_CRC value then becomes the next C_CRC value to be provided to the CRC generator 215 together with the next Jx byte. When each Jx byte has been processed in this way, the final UC_CRC value comprises a transformed 32-bit CRC 'fingerprint' of the path trace identifier. The comparator 217 compares the final UC_CRC value with the corresponding 'expected' CRC value E_CRC and determines whether there is a match or a mismatch.

Should a mismatch occur, then an unexpected or erroneous path trace identifier has been observed. It is not possible to analyse the anomalous transformed path trace identifier since the original path trace identifier cannot be recovered or inferred from a CRC32 checksum value. Accordingly, it is preferred to include a data register (not shown), or other storage device, for storing the un-transformed incoming path trace identifier. In the present example, the data register need only be 16 or 64 bytes in size, depending on the length of the path trace identifier. In the event that a mismatch is detected between the 'final' and 'expected' CRC values, the pre-processor 201 may write the incoming path trace identifier into the data register the contents of which may then be used for investigating network connectivity by, for example, the management system 118.

The apparatus 200 offers the following main advantages over conventional equipment. For the purposes of illustration, the following comparisons are made in the assumption that the normal path trace identifier comprises a string of either 16 or 64 bytes. The per channel storage requirements are reduced from either 64 bytes (SONET) or 16 bytes (SDH) to 8 bytes (32 bits for the expected CRC value and 32 bits for the current CRC value). Hence, the overall reduction in memory requirements is typically between 50% and approximately 88%. Hence, the same number of channels may be monitored but with significant reductions in memory requirements. This has a corresponding effect on silicon usage and therefore on manufacturing cost. Alternatively, significantly more channels can be monitored with the same storage requirement. The additional hardware requirements resulting from the inclusion of a CRC generator are not significant (a hardware CRC32 engine is typically only a few hundred gates in size and, in Time Division Multiplexed traffic, can be shared between all channels). This allows practical path trace monitoring on large capacity traffic devices.

The comparison operation is generally less demanding with a maximum 4 byte comparison required rather than a maximum 64 byte comparison.

The reduced storage requirements may also be used to improve the path trace monitoring functionality. For example the 'previous' path trace CRC value can be stored along with the 'expected' path trace CRC value. This allows stability checking of the path trace—i.e. checking that the current path trace matches the previous one. It would be cost prohibitive in terms of storage requirements to implement this using full 64 byte, or even the shorter 16 byte, storage.

The invention is not limited to the embodiment described herein which may be modified or varied without departing from the scope of the invention.

The invention claimed is:

1. An apparatus for monitoring an identifier associated with a data signal, the apparatus being arranged to receive the identifier and to transform the received identifier, the apparatus being further arranged to compare the transformed received identifier with a correspondingly transformed expected identifier and to determine if there is a match or a mismatch, wherein the apparatus is arranged to transform the received identifier such that the transformed received identifier is smaller than the received identifier.

2. An apparatus as claimed in claim 1, wherein the apparatus is arranged to perform a transform algorithm on the received identifier, the transform algorithm being such that a respective detectably different transformed received identifier is generated in respect of received identifiers which are dissimilar and for received identifiers which are similar, or substantially identical, but not identical.

3. An apparatus as claimed in claim 2, wherein the transform algorithm comprises a hashing algorithm, or a checksum algorithm, or a compression algorithm.

4. An apparatus as claimed in claim 3, wherein the transform algorithm comprises a cyclic redundancy check (CRC) algorithm.

5. An apparatus as claimed in claim 4, wherein the transform algorithm comprises a CRC32 checksum algorithm.

6. An apparatus as claimed in claim 1, wherein the received identifier comprises a plurality of identifier components, the apparatus being arranged to generate the transformed identifier by transforming each identifier component in turn to produce a respective transformed part-identifier, and wherein the transformed part-identifier generated in respect of one identifier component is used in the generation of the transformed part-identifier of the subsequent identifier component.

7. An apparatus as claimed in claim 6, wherein the apparatus is in communication with a first storage device for storing transformed part-identifiers, the apparatus including a transform generator arranged to receive an identifier component and a stored transformed part-identifier, to generate an updated transformed part-identifier, and to store the updated transformed part-identifier in the first storage device.

8. An apparatus as claimed in claim 7, wherein the apparatus is arranged to monitor a plurality of data signals each being associated with a respective identifier, the first storage device comprising a respective storage location for each data signal to be monitored.

9. An apparatus as claimed in claim 1, wherein the apparatus is in communication with a second storage device in which one or more transformed expected identifiers are stored during use.

10. An apparatus as claimed in claim 9, wherein the apparatus includes a comparator arranged to receive and to compare the transformed received identifier with a corresponding transformed expected identifier obtained from the second storage device.

11. An apparatus as claimed in claim 1, wherein the data signal conforms with an SDH (Synchronous Digital Hierarchy) and/or a SONET (Synchronous Optical Network) data structure, and wherein the signal identifier comprises a path or section trace identifier.

12. A method of monitoring an identifier associated with a data signal, the method comprising: receiving the identifier; transforming the received identifier to produce a transformed identifier that is smaller than the received identifier; comparing the transformed received identifier with a correspondingly transformed expected identifier; determining if there is a match or a mismatch.

13. A computer program product comprising computer useable code arranged to cause a computer to perform the method claimed in claim 12.

14. A network element comprising an apparatus for monitoring an identifier associated with a data signal, the apparatus being arranged to receive the identifier and to transform the received identifier, the apparatus being further arranged to compare the transformed received identifier with a correspondingly transformed expected identifier and to determine if there is a match or a mismatch, wherein the apparatus is arranged to transform the received identifier such that the transformed received identifier is smaller than the received identifier.

15. A transport network comprising at least one network element, each network element comprising an apparatus for monitoring an identifier associated with a data signal, the apparatus being arranged to receive the identifier and to transform the received identifier, the apparatus being further arranged to compare the transformed received identifier with a correspondingly transformed expected identifier and to determine if there is a match or a mismatch, wherein the apparatus is arranged to transform the received identifier such that the transformed received identifier is smaller than the received identifier.

* * * * *